Sept. 27, 1938.  L. M. PERSONS  2,131,295
ROOM TEMPERATURE CONTROLLING SYSTEM
Filed Dec. 17, 1934
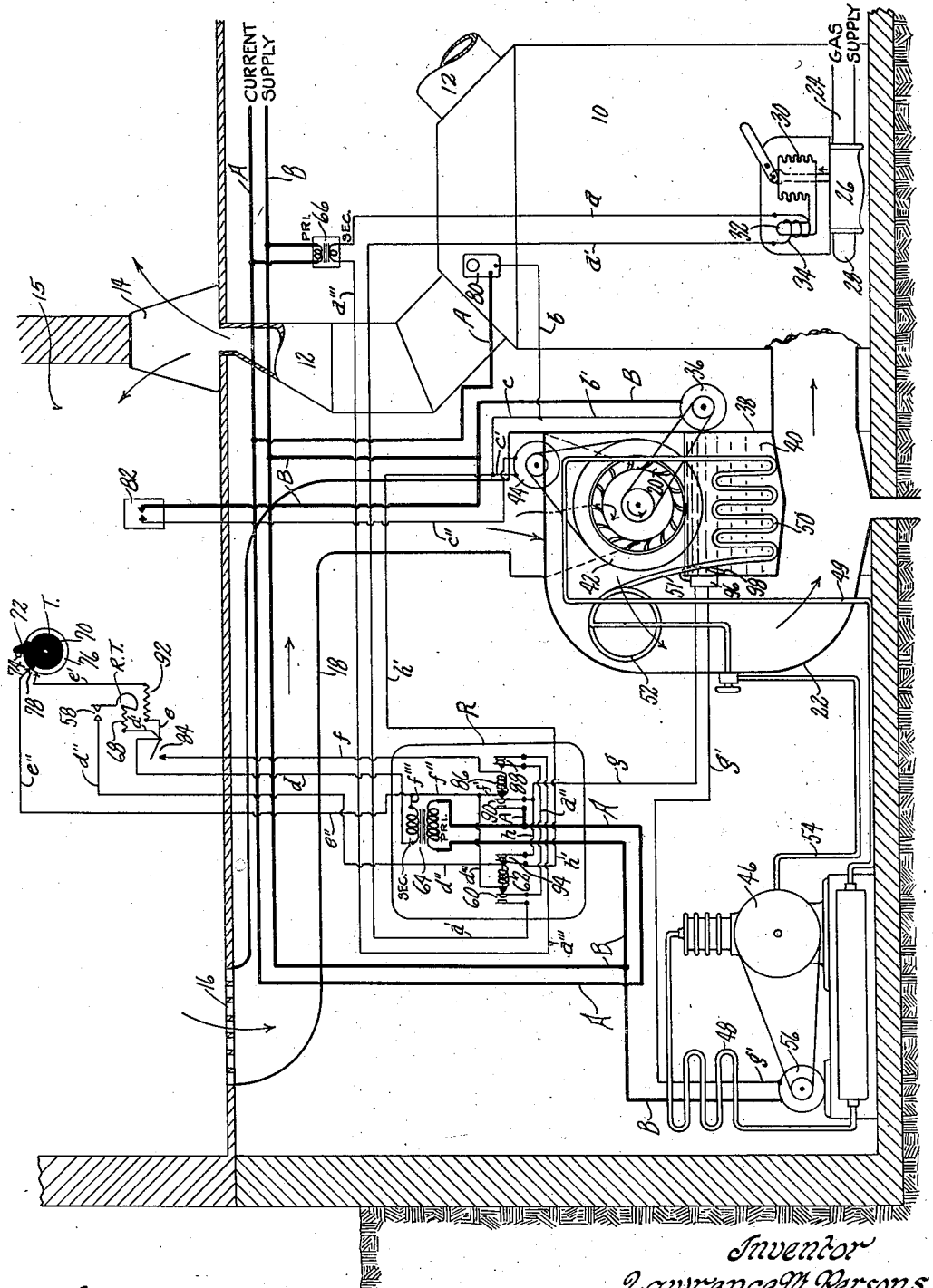
Witness
Edw. Seeber
Inventor
Lawrence M. Persons
by Bair, Freeman & Sinclair
Attorneys Patented Sept. 27, 1938

2,131,295

UNITED STATES PATENT OFFICE 2,131,295

ROOM TEMPERATURE CONTROLLING SYSTEM

Lawrence M. Persons, Des Moines, Iowa, assignor to Penn Electric Switch Co., Des Moines, Iowa, a corporation of Iowa Application December 17, 1934, Serial No. 757,885

15 Claims. (Cl. 236—44)

The object of my invention is to provide a system for controlling the temperature of the air in a room or other enclosure, which is of simple, durable and inexpensive construction, yet adaptable to control the temperature of the air both in the winter and in the summer.

A further object is to provide a room temperature controlling system having a furnace or other heating means and a cooling means for the air, a room thermostat being provided for controlling the heating means when the system is set for winter operation and for controlling the cooling means when it is set for summer operation.

A further object is to provide in connection with the system a humidifying and dehumidifying mechanism controlled by a switch responsive to the temperature of the furnace in the winter time and controlled by a room thermostat in the summer time, the humidifying and dehumidifying elements being additionally controlled by a humidostat responsive to the humidity of the air within the room.

Still a further object is to provide a time operated controller for lowering the temperature at which the furnace is controlled over a desired period of time in the winter time and operable to affect the room thermostat in the summer time, so that a prolonged cooling period can be obtained if desired.

A further object is to provide a system of the general character described, which is easily adjusted for either winter or summer operation by changing the position of a manually controlled switch.

With these and other objects in view, my invention consists in the construction, arrangement and combination of the various parts of my room temperature controlling system, whereby the objects contemplated are attained, as hereinafter more fully set forth, pointed out in my claims, and illustrated in the accompanying drawing, in which:

The figure is a diagrammatic view of my system showing the various controls and electric circuits associated therewith.

On the accompanying drawing, I have used the reference numeral 10 to indicate generally a furnace. This may be of any desired type for heating a room or other enclosure and I have shown one of the hot air circulating type having the hot air outlet pipes 12. One of the pipes 12 is illustrated as terminating in a register 14 for heating the air within a room, such as 15. The cold air register is illustrated at 16, through which the cold air returns by way of a cold air pipe 18 to a blower unit, the fan or blower of which is indicated at 20.

The air circulated by the blower 20 then passes through a duct 22 to the jacket of the furnace 10, where it, of course, is heated to be recirculated through the pipes 12 as already described.

The furnace 10 may be fired with coal, oil, gas or other fuel.

I have illustrated a gas supply pipe 24, a gas supply valve 26, and a pipe 28 leading into the burner within the furnace 10. The valve 26 may be electrically operated in any suitable manner. For this purpose, I have shown a heat motor of the type having an expansible bellows 30, operatively connected with the gas valve, a boiler 32 and a heating element 34. The bellows and boiler are filled with a volatile fluid, which when volatilized expands the bellows for opening the valve.

For operating the blower 20, I illustrate an electric motor 36. The blower is located above a container 38, having water 40 therein, and a plurality of discs 42 are adapted to be rotated by a motor 44 for humidifying or dehumidifying the air blown through the discs by the blower 20. The discs, of course, dip into the water 40 for this purpose.

For cooling the water 40 in the summer time, I provide a refrigerating system, comprising a refrigerant compressor 46, having the usual condenser coil 48, piping 49, cooling coil 50 and return piping 54. I have shown piping 51 and an additional cooling coil 52 interposed between the coil 50 and the piping 54.

The cooling coil 50 is submerged in the water 40 for lowering its temperature while the cooling coil 52 is located in the air stream for helping to cool it.

An electric motor 56 is provided for operating the compressor 46.

For primarily controlling the heating and cooling of the air, I provide a room thermostat R. T. having contacts 58, closable when the temperature reaches a predetermined low value and openable at a slightly higher temperature. The room thermostat 58 controls part of a relay R, specifically a relay coil 62 thereof. The relay coil 62 receives its energy from the secondary of a transformer 64 and when energized closes contacts 60, which control the heating element 34 of the gas valve.

The room thermostat is preferably of the "anticipating" type having a heater 68 adapted to hasten the opening of the thermostat after it is once closed, due to the slight heat generated in the heater 68.

During the night in the winter time, it is desirable to operate the furnace at a lower temperature than during the day time. This can be accomplished by energizing a heater 92 adjacent the room thermostat, so as to add a certain number of degrees of heat to the ambient temperature for thus actually lowering the ambient temperature at which the room thermostat will operate during the period desired. This heater may be controlled by a time switch T consisting for example of an insulating disc 70 normally retained by a spring or the like in the position illustrated with the lug 72 thereof engaging a stop 74. The disc has a collector ring 76 with which contacts 78 may engage.

When the disc is manually rotated, clockwise, it will establish the circuit for the heater 92, and depending on the degree it is rotated clockwise, the desired period for counter-clockwise operation will be predetermined as the disc is returned by clock-actuated mechanism, such as shown in my co-pending application, Serial No. 737,059, filed July 26, 1934. Thus the period desired during which the heater 92 is to be energized can be predetermined, and when the heater is finally de-energized, the furnace will again be controlled at the normal room temperature.

The motor 36 is controlled in the winter time by a fan switch 80, which is normally open, but closes the circuit when there is sufficient heat in the furnace to justify operation of the blower 20, the switch again opening the circuit when the heat becomes so high that it is no longer desirable to operate the blower.

The motor 44 is also controlled by the switch 80 in conjunction with a humidostat 82, so that the motor 44 operates only when the switch 80 is closed, and providing the humidostat 82 is closed, because of the air in the room having insufficient humidity.

For summer operation, I provide a control switch 84, which can be closed to effect cooling controlled by the room thermostat R. T. rather than heating controlled thereby. The switch 84 closes the circuit through a relay coil 86 of the relay R for opening the gas valve circuit through contacts 88, and closing the contacts 90 which supply current through contacts 94 to the motors 36 and 44 which can not be supplied from the switch 80, because it remains open in the summer time.

The contacts 90 also supply current through a control switch 96 to the refrigerating unit. The control switch 96 is provided with a temperature responsive bulb 98 located within the water 40, so as to be responsive to its temperature.

*Practical operation*

Current is supplied to the system through supply wires A and B.

With all parts in the position illustrated on the drawing, the gas valve 26 will be open when the contacts 60 are closed, whereupon the circuit may be traced from the secondary of a transformer 66 through wire a, heater 34, wire a', contacts 60, wire a'', contacts 88 and wire a'''. The contacts 60 themselves are closed whenever the contacts 58 of the room thermostat are closed.

This circuit may be traced from the secondary of the transformer 64 through wires d and d', the heater 68, the wire d'', the relay coil 62, and wires d''', f'' and f'''. Thus when the temperature of the room is too low, the gas valve will be opened and the furnace operated, while when the room thermostat is heated, the gas valve will be closed.

During the operation of the furnace, the blower 20 will be operated at the proper times by the motor 36 as controlled by the fan switch 80.

The circuit for this motor can be traced from the current supply wire A through the fan switch 80, wires b and b', and the motor 36 to the supply wire B. The discs 42 can be roated only while the blower is in operation because they too are controlled from the fan switch 80, although they do not operate when the air in the room is too humid. This is accomplished through the following circuit:

From supply wire A through switch 80 and wires b, c and c', the motor 44, the wire c'' and the humidostat to the supply wire B.

Thus when the air has less than the humidity for which the humidostat 82 is set, the motor 44 will be operated, providing the circuit has been established by the fan switch 80.

For summer operation, the switch 84 is closed. This establishes a circuit through wires d and f, the relay coil 86 and wires f', f'' and f''' for opening the contacts 88, so that the heater 34 can no longer be energized and closing the contacts 90. The closing of the contacts 90 establishes a circuit from the supply wire A through wires h and g, the current through the wire g then passing through the switch 96, if it is in closed position and the wire g' to the motor 56, whereupon it returns to the supply wire B. This places the refrigerator in condition for operation dependent upon the control switch 96.

The current that flowed into the wire h passes through the contacts 94, if they are closed, and the wires h', c and b' to the motor 36, and then returns to the supply wire B.

The current flowing through the wire h', also flows through the wire c' to the motor 44 and returns to the supply wire B by way of the wire c'' and the humidostat 82.

By the arrangement just described, the room thermostat R. T. controls the circulation of cold air in the summer time, as when it is in the open position illustrated, it calls for cooling accomplished by closing of the contacts 94 of the relay R, causing operation of the blower 36 and also operation of the motor 44, if the humidostat calls for increased humidity.

When the room thermostat is satisfied, the contacts 58 will close, whereupon the contacts 94 of the relay R will be opened for discontinuing the flow of current to the motors 36 and 44. This will instantly close the contacts 60 of the relay, but the circuit therefore is open at the contacts 88 caused by closing of the switch 84, so that the furnace can not be energized.

Some changes may be made in the construction and arrangement of the various parts of my room temperature controlling system, without departing from the real spirit and purpose of my invention, and it is my intention to cover by my claims, any modified forms of structure or use of mechanical equivalents, which may be included within their scope.

I claim as my invention:

1. In a heating and cooling system, heating means for air, cooling means for air, a room thermostat, circulating means for passing air in contact with said temperature changing means, means responsive to the temperature of said heating means to control said air circulating means on the heating cycle, humidity changing means associated with said air circulating means and also controlled during the operation of the heating means by said means responsive to the temperature of said heating means, and control means for rendering said cooling means inoperative and causing said room thermostat to control said heating means or render said heating means inoperative, said control means being operable to cause said room thermostat instead of said means responsive to the temperature of said heating means to control said air circulating means, and said humidity changing means when said cooling means is rendered operative.

2. In a system of the character described, heating means, a room thermostat for electrically controlling said heating means, cooling means, control means for selectively rendering either said heating means under the control of said room thermostat or said cooling means operative, air circulating means, a thermostatic switch responsive to the temperature of said heating means for controlling said air circulating means, said control means when rendering said cooling means operative connecting said air circulating means with said room thermostat for control thereby, humidity content changing means associated with said air circulating means, a humidostat responsive to the humidity of the circulated air, said humidity content changing means being controlled during the operation of the heating means by said switch responsive to the temperature of said heating means in conjunction with said humidostat, said control means, when in position rendering said cooling means operative causing said humidity content changing means to be controlled from said room thermostat in conjunction with said humidostat, said cooling means including a refrigerating unit and a cooling unit for the circulated air.

3. In a system of the character described, heating means for air, a room thermostat for electrically controlling said heating means, cooling means for air, control means for selectively energizing said cooling means or energizing said heating means under the control of said room thermostat, circulating means for the air heated by said heating means or cooled by said cooling means, a thermostatic switch responsive to the temperature of said heating means for controlling said air circulating means, said control means when in position rendering said cooling means operative being effective to connect said air circulating means with said room thermostat for control thereby, humidity content changing means associated with said air circulating means, a humidostat responsive to the humidity of the circulated air, said humidity content changing means being controlled during the operation of said heating means by said switch responsive to the temperature of said heating means in conjunction with said humidostat said control means when in position for energizing said cooling means causing said humidity content changing means to be controlled from said room thermostat in conjunction with said humidostat.

4. In a system of the character described, heating means for air, a room thermostat for electrically controlling said heating means, cooling means for air, control means for selectively energizing said cooling means or energizing said heating means under the control of said room thermostat, circulating means for the air heated by said heating means or cooled by said cooling means, a thermostatic switch responsive to the temperature of said heating means for controlling said air circulating means, said control means when in position rendering said cooling means operative being effective to connect said air circulating means with said room thermostat for control thereby and humidity content changing means associated with said air circulating means, a humidostat responsive to the humidity of the circulated air, said humidity content changing means being controlled during the operation of said heating means by said switch responsive to the temperature of said heating means in conjunction with said humidostat.

5. In a system of the character described, heating means for air, a room thermostat for electrically controlling said heating means, cooling means for air, control means for selectively energizing said cooling means or energizing said heating means under the control of said room thermostat, circulating means for the air heated by said heating means or cooled by said cooling means, a thermostatic switch responsive to the temperature of said heating means for controlling said air circulating means, said control means when in position rendering said cooling means operative being effective to connect said air circulating means with said room thermostat for control thereby and humidity content changing means associated with said air circulating means.

6. In a system of the character described, heating means for air, a room thermostat for electrically controlling said heating means, cooling means for air, control means for selectively energizing said cooling means or energizing said heating means under the control of said room thermostat, circulating means for the air heated by said heating means or cooled by said cooling means, a thermostatic switch responsive to the temperature of said heating means for controlling said air circulating means, said control means when in position rendering said cooling means operative being effective to connect said air circulating means with said room thermostat for control thereby, a humidostat responsive to the humidity of the circulated air and humidity content changing means associated with said air circulating means, said humidity content changing means being controlled by said switch responsive to the temperature of said heating means in conjunction with said humidostat when said control means is in position energizing said heating means in response to the room thermostat.

7. In a system of the character described, cooling means for air, circulating means for the air cooled by said cooling means, a room thermostat for controlling said air circulating means, a humidostat and humidity content changing means associated with said air circulating means and controlled from said room thermostat and humidostat in conjunction, said cooling means including a refrigerating unit and an air cooling unit and automatic control means for said refrigerating unit responsive to the temperature of said cooling unit.

8. In a system of the character described, heating means for air, a circuit therefor, a room thermostat for electrically controlling said heating means, cooling means for air, a relay for energizing said cooling means and opening the circuit of said heating means, air circulating means for passing the air into contact with said temperature changing means, a thermostatic switch responsive to the temperature of said heating means for controlling said air circulating means, said relay, on the cooling cycle, adapted to connect said air circulating means with said room thermostat for control thereby, humidity content changing means associated with said air circulating means and a humidostat responsive to the humidity of the circulated air, said humidity content changing means being controlled during the operation of said heating means by said thermostatic switch in conjunction with said humidostat.

9. In a system of the character described, heating means, a circuit therefor, a relay for electrically controlling said heating means, a room thermostat for controlling said relay, cooling means, said relay in one position energizing said cooling means and opening the circuit of said heating means, air circulating means, a thermostatic switch responsive to the temperature of said heating means for controlling said air circulating means, said relay when in said position connecting said air circulating means with said room thermostat for control thereby, humidity content changing means associated with said air circulating means, a humidostat responsive to the humidity of the circulated air, said humidity content changing means being controlled during the operation of the heating means by said switch responsive to the temperature of said heating means in conjunction with said humidostat, said relay when in said position causing said humidity content changing means to be controlled from said room thermostat in conjunction with said humidostat, said cooling means including a refrigerating unit and a cooling unit for the circulated air, and automatic control means for said refrigerating unit responsive to the temperature of the cooling unit.

10. In a system of the character described, heating means, a circuit therefor, a relay for electrically controlling said heating means, a room thermostat for controlling said relay, cooling means, said relay having a control switch for energizing said cooling means and opening the circuit of said heating means when the control switch is in one position, air circulating means, a thermostatic switch responsive to the temperature of said heating means for controlling said air circulating means, said control switch of said relay when in said position connecting said air circulating means with said room thermostat for control thereby, humidity content changing means associated with said air circulating means, a humidostat responsive to the humidity of the circulated air, said humidity content changing means being controlled during the operation of the heating means by said switch responsive to the temperature of said heating means in conjunction with said humidostat, said control switch of said relay when in said position causing said humidity content changing means to be controlled from said room thermostat in conjunction with said humidostat, said cooling means including a refrigerating unit and a cooling unit for the circulated air.

11. In a system of the character described, heating means for air, a circuit therefor, a relay for electrically controlling said heating means, a room thermostat for controlling said relay, cooling means for air, said relay having a control switch for energizing said cooling means and opening the circuit of said heating means when the control switch is in one position, circulating means for passing the air in contact with said temperature changing means, a thermostatic switch responsive to the temperature of said heating means for controlling said air circulating means, said control switch of said relay when in said position connecting said air circulating means with said room thermostat for control thereby, a humidostat responsive to the humidity of the circulated air, humidity content changing means associated with said air circulating means, said humidity content changing means being controlled during the operation of said heating means by said switch responsive to the temperature of said heating means in conjunction with said humidostat, said control switch of said relay when in said position causing said humidity content changing means to be controlled from said room thermostat in conjunction with said humidostat.

12. In a system of the character described, heating means for air, cooling means for air, a control circuit therefor including a relay, a room thermostat in said circuit for controlling said heating means, said relay having switch means for energizing said cooling means and opening the circuit of said heating means, circulating means for passing air in contact with said temperature changing means, a thermostatic switch responsive to the temperature of said heating means for controlling said air circulating means on the heating cycle, said relay when on the cooling cycle adapted to connect said air circulating means with said room thermostat for control thereby, a humidostat responsive to the humidity of the circulated air, humidity changing means associated with said air circulating means, said humidity changing means being controlled during the operation of the heating means by said switch responsive to the temperature of said heating means in conjunction with said humidostat.

13. In a system of the character described, heating means for air, cooling means for air, a control circuit therefor including a relay, a room thermostat in said circuit for controlling said heating means, said relay having switch means for energizing said cooling means and opening the circuit of said heating means, circulating means for passing air in contact with said temperature changing means, a thermostatic switch responsive to the temperature of said heating means for controlling the air circulating means on the heating cycle, said relay when on the cooling cycle connecting said air circulating means with said room thermostat for control thereby, and humidity changing means associated with said air circulating means.

14. In a system of the character described, a room thermostat, air cooling means, a control circuit therefor including a relay, a control switch for said relay, circulating means for the air cooled by said cooling means, said relay adapted when said control switch is closed to connect said air circulating means with said room thermostat for control thereby, humidity changing means associated with said air circulating means, a humidostat responsive to the humidity of the circulated air, said relay adapted when said control switch is closed to connect said humidity changing means with said room thermostat for control thereby in conjunction with said humidostat, said cooling means including a refrigerating unit and an air cooling unit, and automatic control means therefor responsive to the temperature of said cooling unit.

15. In a system of the character described, a room thermostat, cooling means, a switch controlled relay adapted on closing said switch to energize said cooling means, air circulating means, said relay adapted to connect said air circulating means with said thermostat for control thereby, a humidity changing means associated with said air circulating means, a humidostat responsive to the humidity of the circulated air, said relay adapted to place said humidity changing means under the control of said room thermostat in conjunction with said humidostat.

LAWRENCE M. PERSONS.